Dec. 22, 1953 S. DARLINGTON 2,663,806
SEMICONDUCTOR SIGNAL TRANSLATING DEVICE
Filed May 9, 1952
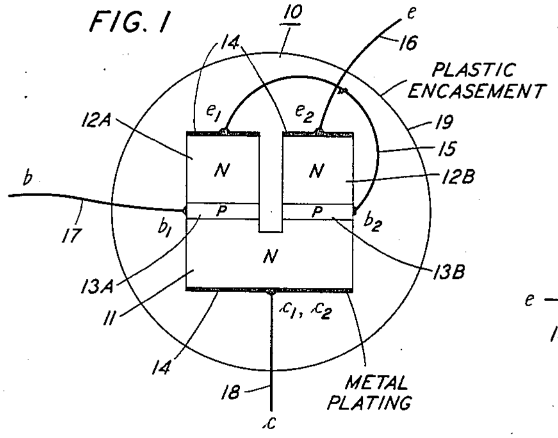
FIG. 2
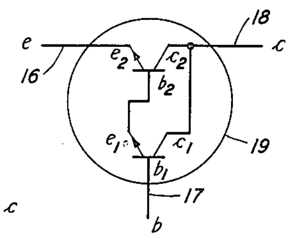
FIG. 2A
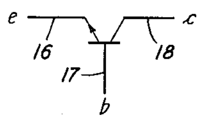
FIG. 3
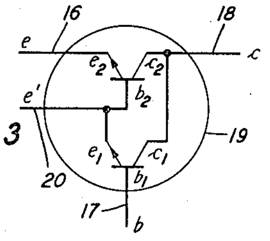
FIG. 4
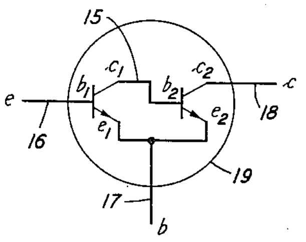
FIG. 5
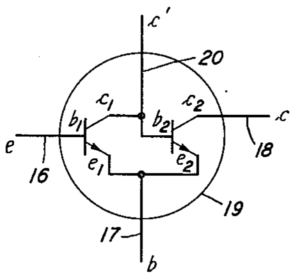
FIG. 4A
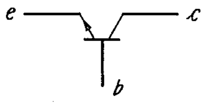
FIG. 6
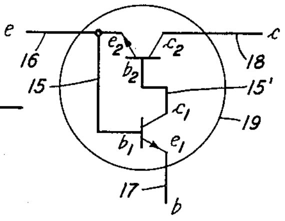
FIG. 6A
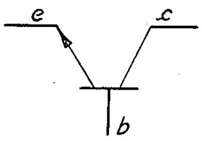
FIG. 7
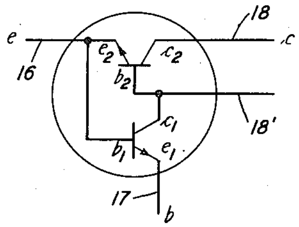
FIG. 8
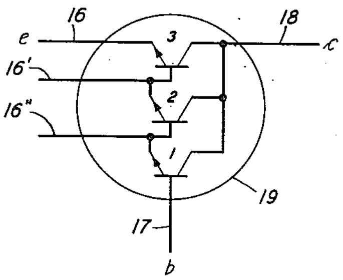
FIG. 9
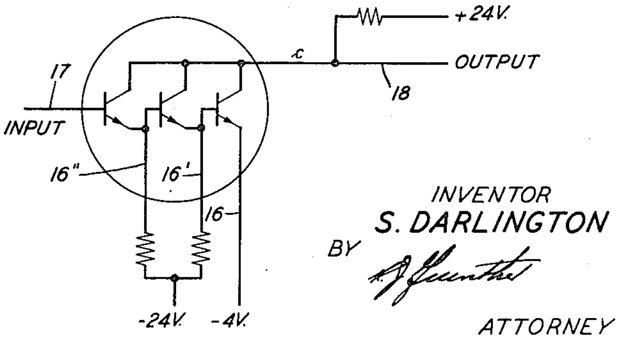
INVENTOR
S. DARLINGTON
BY [signature]
ATTORNEY Patented Dec. 22, 1953 2,663,806

UNITED STATES PATENT OFFICE 2,663,806

SEMICONDUCTOR SIGNAL TRANSLATING DEVICE

Sidney Darlington, Passaic Township, Morris County, N. J., assignor to Bell Telephone Laboratories, Incorporated, New York, N. Y., a corporation of New York Application May 9, 1952, Serial No. 286,914

10 Claims. (Cl. 307—88)

This invention relates to signal translating devices and more particularly to such devices of the type known as transistors.

Transistors comprise, in general, a body of semiconductive material and three connections, termed the emitter, base and collector, to the body. Two recognized classes of transistors are the point contact, of which those disclosed in Patent 2,524,035 granted October 3, 1950 to J. Bardeen and W. H. Brattain are illustrative, and the junction, of which those disclosed in Patent 2,569,347 granted September 25, 1951 to W. Shockley are illustrative. Transistors of both kinds may be classified further as to conductivity type, that is N or P. In an N-type point contact device, the bulk of the semiconductive body is of N conductivity type; in an N-type junction transistor, the intermediate zone, i. e. the one with which the emitter and collector zones form junctions, is of N conductivity type. In P-type transistors, the bulk of the body, in point contact devices, or the intermediate zone, in junction devices, is of P conductivity type.

In the utilization of transistors, a number of what may be considered as circuit parameters or aspects are of prime moment. Among and illustrative of such parameters are the current multiplication factor, commonly designated alpha, and the emitter and collector resistances. In general, desired values, within limits of course, for one or more of these parameters may be obtained for a particular application by control of or operation upon physical characteristics of the transistor employed. For example, in the case of junction type transistors, say of PNP configuration, the current multiplication factor alpha is less than unity. It is dependent upon a number of controllable factors, such as the width of the intermediate zone, but the control entails some practical difficulties and thus involves a definite, and in some cases a major economic aspect. Similarly, the emitter and collector resistances are amenable to control by design but the control is subject to practical and economic limitations.

Further, heretofore because of inherent properties of semiconductor translating devices, some desired circuit characteristics have been difficult or impossible to achieve with single transistors, or even with combinations of transistors unless special interstage or coupling networks are employed.

One general object of this invention is to enable realization of desired prescribed performance characteristics for semiconductor signal translating devices.

More specific objects of this invention are to expedite attainment of prescribed circuit parameters for transistor units, to facilitate realization of high current multiplication factors for transistors, to obtain such factors closely approaching but not exceeding unity for junction transistors, to simplify the construction of transistor units comprising two or more elements, to enhance flexibility of operation and utilization of transistors, and to reduce the cost of producing transistor units having prescribed circuital parameters.

In accordance with one feature of this invention, two transistors of like conductivity type are correlated to produce an equivalent single transistor having operating characteristics different in kind or quality or both from those of both the components.

In one illustrative embodiment of this invention, a translating device comprises a pair of similar junction transistors the collector zones of which are electrically integral and the base zone of one of which is tied directly to the emitter zone of the other. Individual connections are provided to the other emitter and base zones. The device constitutes an equivalent single transistor having emitter and collector resistances substantially equal to those of one of the component transistors, but having a current multiplication factor substantially greater than that of either of the components.

In a modification of the above-described embodiment, an additional connection is provided to the connected emitter and base, whereby an additional bias may be applied and greater flexibility in operation, for example as to the operating point, is realized.

In other embodiments, different pairs of the emitter, base and collector connections are tied together electrically to produce advantageous performance characteristics.

The invention and the above noted and other features thereof will be understood more clearly and fully from the following detailed description with reference to the accompanying drawing, in which:

Fig. 1 is an elevational view of a transistor illustrative of one embodiment of this invention;

Fig. 2 is a schematic showing the association of the transistor elements in a device of the type illustrated in Fig. 1;

Figure 2A is a diagram representing the equivalent single transistor of the combinations portrayed in Figs. 1 and 2;

Fig. 3 illustrates a modification of the device represented in Fig. 2;

Fig. 4 depicts another embodiment of this invention wherein the emitters of the component elements are tied together directly;

Fig. 4A is a diagram representing the equivalent single transistor for the embodiment depicted in Fig. 4;

Fig. 5 illustrates a modification of the device shown in Fig. 4;

Fig. 6 illustrates another embodiment of this invention wherein the emitter of one transistor component is tied directly to the base of another;

Fig. 6A depicts the equivalent single transistor for the combination illustrated in Fig. 6;

Fig. 7 represents a modification of the embodiment illustrated in Fig. 6; and

Figs. 8 and 9 portray another embodiment of this invention including three transistor elements.

In the drawing, for facility of identification the emitter, base and collector terminals have been indicated by the letters *e*, *b* and *c* respectively.

In devices constructed in accordance with this invention, advantageously the semiconductive material, for example germanium or silicon, is of single crystal structure. Suitable single crystal material may be produced in one way as disclosed in the application Serial No. 234,403, filed June 29, 1951 of E. Buehler and G. K. Teal. Also, as indicated hereinafter, in some embodiments of the invention advantageously the transistor elements are enclosed in a plastic encasement. Such encasement may be effected in the manner disclosed in the application Serial No. 198,294, filed November 30, 1950 of J. V. Domaleski, E. L. Gartland and J. J. Kleimack.

Referring now to the drawing, the transistor illustrated in Fig. 1 comprises a body 10 of semiconductive material, for example germanium or silicon, having an N conductivity type zone 11, a pair of like N conductivity type zones 12A and 12B and a pair of like P conductivity type zones 13A and 13B each interposed between and defining junctions with the N zone 11 and the respective N zone 12A or 12B. The body may be fabricated for example by slotting a slab of NPN configuration and produced in the manner disclosed in the application of Buehler and Teal referred to hereinabove.

Metallic platings 14, for example in the form of copper or rhodium coatings, are applied to the N zones 11 and 12 whereby substantially ohmic connections may be made in these zones. Substantially ohmic connections are made also to the two P zones 13, for example in the manner disclosed in the application Serial No. 228,483 filed May 26, 1951 of W. Shockley. It will be evident that the semiconductive body with the connections thereto comprises two like transistor units each of NPN configuration, the units having a common collector zone 11, individual emitter zones 12 and individual base zones 13.

As shown in Fig. 1, the emitter zone 12A of one unit is tied directly by a conductor 15 to the P zone 13B of the other unit. Thus, there is provided a unitary or equivalent single transistor having emitter, base and collector terminals or connections 16, 17 and 18 respectively.

The electrical equivalent of the compound transistor illustrated in Fig. 1 is portrayed in Fig. 2 and one equivalent single transistor is of the form depicted in Fig. 2A. For the single equivalent transistor the significant performance characteristics are represented by the following equations:

$$r_e \cong r_{e2}$$

$$r_b \cong r_{b1} + \frac{r_{c1}}{r_{c2}}(r_{e1} + r_{b2})$$

$$r_c \cong r_{c1}$$

$$I_{c0} \cong I_{c01}$$

$$V_e = r_e I_e + r_b (I_c + I_e)$$

$$V_c = r_c (I_c - I_{c0} + \alpha I_e) + r_b (I_c + I_e)$$

$$(1-\alpha) = (1-\alpha_1)(1-\alpha_2)$$

where $r_e$=emitter resistance
$r_b$=base resistance
$r_c$=collector resistance
$I_{co}$=collector current with zero emitter current
$I_e$=emitter current
$I_c$=collector current
$V_e$=emitter voltage
$V_c$=collector voltage and the subscripts 1 and 2 refer to the component units.

Particularly to be noted among these characteristics is the high value of the current multiplication factor, alpha, that may be realized. For example, in the case of NPN units, if alpha equals 0.9 for each unit, alpha for the single equivalent transistor is 0.99. Also, for example, if alpha for the individual units is 0.99 then the multiplication factor for the equivalent single transistor is .9999. If the current multiplication factors of the individual units vary, the alpha of the equivalent transistor varies relatively little. Specifically, variability in $(1-\alpha_1)$ or $(1-\alpha_2)$ produces a like percentage variability in the relatively small quantity $(1-\alpha)$.

This may be explained as follows: The current $I_b$ flowing out of the base of a transistor is $I_e+I_c$, where $I_e$ and $I_c$ are currents flowing into the other electrodes (emitter and collector). If we consider only the variations in $I_e$ and $I_c$, which define current gain $\alpha$, and if we assume a collector load impedance small compared with $R_c$, $I_b$ becomes $(1-\alpha)I_e$.

Accordingly, current $(1-\alpha_1)I_{e1}$ flows out of the base of unit 1, and $(1-\alpha_2)I_{e2}$ out of the base of unit 2. In the triode mounting $I_{e1}$ is constrained to be the base current $I_{b2}$. Hence $(1-\alpha_1)(1-\alpha_2)I_{e2}$ flows out of the base of unit 1. In addition $I_{e2}$ is constrained to be the current $I_e$ into the equivalent emitter terminal and $I_{b1}$ is constrained to be $I_b$. Hence $$(1-\alpha_1)(1-\alpha_2)I_e$$

flows out of the equivalent base, and is equivalent to $(1-\alpha)I_e$:

$$(1-\alpha) = (1-\alpha_1)(1-\alpha_2)$$

The operating points of the two component units cannot be chosen independently, nor can they be the same for the two units. One restriction requires the collector-to-emitter voltage of unit 1 to be equal to the collector-to-base voltage of unit 2. However, emitter-to-base voltages are usually small, and thus both collector voltages are roughly equal. This is a reasonable operating condition.

With the triode mounting, there is also a relation between the currents at the operating points. As noted above, $I_{e1}=I_{b2}$. When total current is considered, the so-called "drift current" $I_{c02}$ must be included, as well as the variations in currents which define $\alpha$. Then, assuming again a load impedence small compared with $R_c$, $I_{b2}$ becomes $(1-\alpha_2)I_{e2}+I_{c02}$. This current is used as $I_{e1}$, and must be negative. Since $I_{c02}$ is positive, $I_{e2}$ must not only be negative, but also large enough so that $(1-\alpha_2)I_{e2}$ more than compensates for $I_{c02}$.

The restriction on the bias currents which may be utilized can be reduced or avoided by the provision of another connection as illustrated in Fig. 3. Specifically, as shown in this figure, an auxiliary lead 20 is provided as a common connection to the base of one unit and the emitter of the other. This connection 20 may be utilized to supply additional negative current to the emitter $e_1$. If this current is supplied through a high impedance, the alpha of the equivalent signal transistor will not be degraded significantly.

Although the transistors of the configuration depicted in Figs. 2 and 3 have been described with particular reference to junction transistors and to such fabricated from a single semi-conductive body or slab, similar devices composed of separate junction units or of separate point contact units such as described in the Bardeen-Brattain patent heretofore identified obviously are within the purview of this invention.

In the embodiment of this invention illustrated in Fig. 4, the emitters of the two like units are tied together and the collector of one unit is tied directly to the base of the other by the connector 15. Emitter, base and collector leads 16, 17 and 18 respectively are provided as shown, it being noted that the base lead extends from the two emitters in common. This is because a correspondence between the emitter of the equivalent single transistor, depicted in Fig. 4A, and the component emitters, i. e. those of the two units, involves a phase relation which makes the collector resistance $R_c$ negative.

The units of the embodiment shown in Fig. 4 may be of either the junction or the point contact type. For example, in one form the semiconductive body may be of the construction illustrated in Fig. 1, with the N zone 11 serving as the common emitter zone and the zones 12 constituting the collector zones.

When the units are of NPN configuration, the parameters of the transistor portrayed in Figs. 4 and 4A are given by the relations:

$$r_e \cong r_{b1}+\frac{r_{e1}}{1-\alpha_1}$$

$$r_b \cong \frac{r_{e1}r_{e2}}{(1-\alpha_1)r_{c1}}$$

$$r_c \cong (1-\alpha_2)r_{c2}$$

$$I_{c0} \cong \frac{I_{c01}}{(1-\alpha_1)(1-\alpha_2)}$$

$$\alpha \cong \frac{\alpha_1\alpha_2}{(1-\alpha_1)(1-\alpha_2)}$$

$$V_e=r_eI_e+r_b(I_c+I_e)$$

$$V_c=r_c(I_c-I_{c0}+\alpha I_e)+r_b(I_c+I_e)$$

It will be evident from these that the current gain, indicated by alpha, may be very large. Also, it is noted that the emitter resistance $R_e$ of the compound transistor is greater than that of either the component units whereas the collector resistance $R_c$ is smaller. Also the base resistance $R_b$ is very small.

As in the case of the embodiment illustrated in Fig. 2, in that shown in Fig. 4 a limitation on bias currents obtains. This restriction may be reduced, if desired, by providing an additional biasing lead 20 as illustrated in Fig. 5.

In the embodiment of the invention portrayed in Fig. 6, two transistor units, of like characteristics and of either the junction or point contact type, are employed as in the embodiments described hereinabove. However, as shown in Fig. 6, the emitter of one unit is tied directly to the base of the other by the conductor 15, and the base of the first is tied directly to the collector of the second by the conductor 15'. Base and collector leads 17 and 18 individual to the emitter of one unit and the collector of the other respectively are provided as shown and the third, emitter, lead is provided to the connected base and emitter of the two units. The equivalent single transistor is depicted in Fig. 6A.

For the case of units of NPN configuration, the parameters of the equivalent single transistor are given by the following relations:

$$r_e \cong \frac{r_{b1}r_{e2}}{r_{c1}}$$

$$r_b \cong r_{e1}+(1-\alpha_1)r_{b1} \cong r_{e1}$$

$$r_c \cong r_{c2}$$

$$I_{c0} \cong I_{c02}-\alpha_2 I_{c01}$$

$$1-\alpha \cong \frac{1-\alpha_2}{1-\alpha_2+\alpha_1\alpha_2} \cong 1-\alpha_2$$

$$V_e=r_eI_e+r_b(I_c+I_e)$$

$$V_c=r_c(I_c-I_{c0}+\alpha I_e)+r_b(I_c+I_e)$$

It will be noted that the constants for the equivalent single transistor are very similar except for the emitter resistance to those for component unit 2, provided that alpha for unit 1 is substantially unity. However, a feature of the embodiment illustrated in Fig. 6A is that the drift currents for the two component units tend to cancel in the collector lead 18. Such cancellation is realized to the fullest extent when the emitter lead 16 is fed through a high impedance.

For the device illustrated in Fig. 6, the current bias restrictions are akin to those for the other embodiments heretofore described and may be reduced through the agency of an additional lead 18' extending to the connected collector and base of the two units. To assure good drift current cancellation, this lead should be supplied through a high impedance.

In some applications, the auxiliary lead 18' may be used as the input signal supply. In this case, unit 1 functions solely as a drift current balancing element.

Although the invention has been described thus far with particular reference to transistors composed of two units, it may be utilized also in devices comprising a greater number of units. One illustrative embodiment including three units having their collectors common and base and emitter connected as in the embodiment disclosed in Fig. 1 is shown in Fig. 8. Fig. 9 shows how this device may be biased for grounded emitter operation, typical values of bias being indicated.

Two particularly advantageous features of the multiple unit transistor portrayed in Fig. 8 are to be noted. First, for the case of NPN units, the current multiplication factor, alpha, for the transistor is even closer to unity than for a two unit device of comparable units. Secondly, it will be appreciated that the three unit transistor of Fig. 8 provides two auxiliary leads 16′ and 16′′ whereby appropriate biases may be applied. This reduces the bias current limitations discussed hereinabove. Further, it avoids voltage restrictions which may be encountered in some cases. For example, in the embodiment illustrated in Fig. 4, it is necessary that the collector to emitter voltage of unit 1 substantially match the base to emitter voltage of unit 2. This in turn necessitates either a low voltage level for one unit and a high voltage level for the other, or both. This design restriction is avoided by use of a three unit structure such as represented in Fig. 8.

It will be appreciated that the invention provides transistors of novel and advantageous performance characteristics, characteristics which either are unattainable with single unit devices or are quantitatively superior to those obtainable with single unit devices.

Although specific embodiments of the invention have been shown and described, it will be understood that they are but illustrative and that various modifications may be made therein without departing from the scope and spirit of this invention.

What is claimed is:

1. A signal translating device comprising a pair of transistors of like conductivity type and each including a base, an emitter and a collector, means directly connecting the collectors together, means directly connecting the emitter of one transistor to the base of the other, and individual electrical connections to the other emitter and base.

2. A signal translating device in accordance with claim 1 comprising an additional electrical connection to the connected emitter and base.

3. A signal translating device comprising a pair of transistors of like conductivity type and each including a base, an emitter and a collector, means directly connecting the emitters together, means directly connecting the collector of one transistor to the base of the other, and individual electrical connections to the other collector and base.

4. A signal translating device in accordance with claim 3 comprising an additional electrical connection to the connected collector and base.

5. A signal translating device comprising a pair of transistors of like conductivity type and each including a base, an emitter and a collector, means directly connecting two like electrodes of said transistors together, means directly connecting another electrode of one transistor to an unlike electrode, other than one of said like electrodes, of the other transistor, and individual electrical connections to the remaining electrodes.

6. A signal translating device in accordance with claim 5 wherein said transistors are of the junction type.

7. A signal translating device in accordance with claim 5 wherein said transistors are of the point contact type.

8. A signal translating device comprising a body of semi-conductive material having therein a first zone of one conductivity type, a pair of spaced zones of the opposite conductivity type contiguous with said first zone and a pair of zones of said one type each contiguous with a respective one of said first pair of zones, and remote from the other, means electrically connecting one of said first pair of zones to the one of said second pair of zones remote therefrom, and individual electrical connections to said first zone, the other of said first pair of zones and the other of said second pair of zones.

9. A signal translating device in accordance with claim 8 wherein said first zone is of N conductivity type.

10. A signal translating device comprising three transistors of the same conductivity type and each including an emitter, a collector and a base, means directly connecting the collectors together electrically, means connecting the base of one transistor directly to the emitter of a second transistor, means connecting the base of said second transistor to the emitter of the third transistor, and individual connections to the emitter of said one transistor and the base of said third transistor.

SIDNEY DARLINGTON.

References Cited in the file of this patent

UNITED STATES PATENTS

| Number | Name | Date |
|---|---|---|
| 2,476,323 | Rack | July 19, 1949 |
| 2,569,347 | Shockley | Sept. 25, 1951 |
| 2,585,078 | Barney | Feb. 12, 1952 |
| 2,586,080 | Pfann | Feb. 19, 1952 |
| 2,595,496 | Webster | May 6, 1952 |
| 2,595,497 | Webster | May 6, 1952 |